United States Patent
Rai et al.

(10) Patent No.: US 7,570,810 B2
(45) Date of Patent: Aug. 4, 2009

(54) METHOD AND APPARATUS APPLYING DIGITAL IMAGE FILTERING TO COLOR FILTER ARRAY DATA

(75) Inventors: Barinder Singh Rai, Surrey (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 673 days.

(21) Appl. No.: 11/066,000

(22) Filed: Feb. 24, 2005

(65) Prior Publication Data

US 2006/0188147 A1 Aug. 24, 2006

(51) Int. Cl.
*G06K 9/00* (2006.01)

(52) U.S. Cl. .................. 382/167; 382/162; 382/160; 348/222.1

(58) Field of Classification Search .............. 382/167, 382/170, 168, 169, 162, 164; 348/312, 65, 348/213, 272

See application file for complete search history.

(56) References Cited

U.S. PATENT DOCUMENTS

| | | | |
|---|---|---|---|
| 3,971,065 A | 7/1976 | Bayer | |
| 5,506,619 A * | 4/1996 | Adams et al. | 348/272 |
| 5,568,192 A * | 10/1996 | Hannah | 348/222.1 |
| 5,696,848 A * | 12/1997 | Patti et al. | 382/254 |
| 6,091,862 A * | 7/2000 | Okisu | 382/300 |
| 6,205,245 B1 | 3/2001 | Yuan et al. | |
| 6,348,929 B1 | 2/2002 | Acharya et al. | |
| 6,424,753 B1 * | 7/2002 | Yamaguchi | 382/300 |
| 6,570,616 B1 * | 5/2003 | Chen | 348/272 |
| 6,593,963 B1 * | 7/2003 | Safai | 348/222.1 |
| 6,744,916 B1 * | 6/2004 | Takahashi | 382/162 |
| 6,771,811 B1 * | 8/2004 | Walmsley et al. | 382/162 |
| 6,825,876 B1 * | 11/2004 | Easwar et al. | 348/234 |
| 6,870,564 B1 * | 3/2005 | Burns | 348/263 |
| 7,079,705 B2 * | 7/2006 | Zhang et al. | 382/280 |
| 7,206,458 B2 * | 4/2007 | Battiato et al. | 382/250 |
| 7,227,991 B2 * | 6/2007 | Castorina et al. | 382/167 |
| 2001/0045988 A1 | 11/2001 | Yamauchi et al. | |
| 2002/0044691 A1 * | 4/2002 | Matsugu | 382/218 |
| 2003/0048368 A1 | 3/2003 | Bosco et al. | |
| 2003/0122937 A1 | 7/2003 | Guarnera et al. | |
| 2003/0128893 A1 | 7/2003 | Castorina et al. | |
| 2003/0218679 A1 | 11/2003 | Castorina et al. | |
| 2005/0031222 A1 * | 2/2005 | Hel-Or | 382/260 |

FOREIGN PATENT DOCUMENTS

| | | |
|---|---|---|
| EP | 1 289 309 A1 | 3/2003 |
| EP | 1 308 888 A1 | 5/2003 |

(Continued)

OTHER PUBLICATIONS

Chin Chye Koh and Sanjit k. Mitra "Compression of Bayer color Filter Array data" IEEE 2003, p. 255-258.*

(Continued)

*Primary Examiner*—Samir A. Ahmed
*Assistant Examiner*—Mekonen Bekele

(57) ABSTRACT

A method and graphics controller for processing an image is provided wherein color filter array (CFA) data representing the image is received from a digital image capture device into a buffer, a digital filter effect is applied to the CFA data to generate filtered CFA data representing a filtered image, and the filtered image is displayed in real time on a display.

29 Claims, 5 Drawing Sheets

FOREIGN PATENT DOCUMENTS

| | | |
|---|---|---|
| EP | 1 326 209 A1 | 7/2003 |
| EP | 1 394 742 A1 | 3/2004 |
| JP | 2003-199115 A | 7/2003 |
| JP | 2003-199119 A | 7/2003 |
| WO | WO 03107274 A2 * | 12/2003 |

OTHER PUBLICATIONS

Rastislav Lukac, Konstantinos N. Plataniotis, and Bogdan Smolka "A New Color Filter Array Interpolation Approach for Single-Sensor Imaging" Springer-Verlag Berlin Heidelberg 2004, p. 281-288.*

ENDS489 Course Notes—Fall 2000, Neighborhood Operations, Theory and Applications, H. E. Burdick, Mc Graw-Hill, 1997, http://wwwviz.tamu.edu/faculty/parke/ends489f00/notes/sec1_8.html.*

A. Clarke, C. Eberhardt "Microscopy Techniques for Materials Science", Published by Woodhead Publishing, 2002 p. 144-145.*

Wenmiao Lu and Yap-Peng Ten, "Color Filter Array Demosaicking: New Method and Performance Measures" IEEE Transactions on Image Processing, vol. 12, No. 10, Oct. 2003, pp. 1194-1210.*

Gunturk et al., "Color Plane Interpolation Using Alternating Projections", IEEE Transactions on Image Processing, vol. 11, No. 9, Sep. 2002, pp. 997-1013.*

"Temporal Noise Reduction of Bayer Matrixed Video Data", Angelo Bosco, Massimo Mancuso, Sebastiano Battiato, Giuseppe Spampinato, ST Microelectronics, Digital Still Camera & Multimedia Mobile Group, Stradale Primosole 50, 95121 Catania—Italy, 0-7803-7304-9/02/$17.00 C2002 IEEE, (pp. 681-684) (2002).

* cited by examiner

FIG. 6A

| $G_8$ | $G_{10}$ | $G_{15}$ | $G_{22}$ |
|---|---|---|---|
| $G_8$ | $G_{13}$ | $G_{15}$ | $G_{20}$ |
|   | $G_{13}$ | $G_{20}$ |   |

| $R_2$ | $R_4$ | $R_{16}$ | $R_{16}$ |
|---|---|---|---|
| $R_2$ | $R_{14}$ | $R_{14}$ |   |
|   | $R_{14}$ | $R_{14}$ |   |

| $B_9$ | $B_9$ | $B_{21}$ |
|---|---|---|
| $B_9$ | $B_9$ | $B_{21}$ |
| $B_7$ | $B_7$ | $B_{19}$ |

| $G_1$ | $R_2$ | $G_3$ | $R_4$ | $G_5$ | $R_6$ |
|---|---|---|---|---|---|
| $B_7$ | $G_8$ | $B_9$ | $G_{10}$ | $B_{11}$ | $G_{12}$ |
| $G_{13}$ | $R_{14}$ | $G_{15}$ | $R_{16}$ | $G_{17}$ | $R_{18}$ |
| $B_{19}$ | $G_{20}$ | $B_{21}$ | $G_{22}$ | $B_{23}$ | $G_{24}$ |
| $G_{25}$ | $R_{26}$ | $G_{27}$ | $R_{28}$ | $G_{29}$ | $R_{30}$ |
| $B_{31}$ | $G_{32}$ | $B_{33}$ | $G_{34}$ | $B_{35}$ | $G_{36}$ |

| $G_8$ | $G_{10}$ | $G_{12}$ |
|---|---|---|
| $G_8$ | $G_{10}$ | $G_{17}$ |
| $G_{13}$ | $G_{15}$ | $G_{17}$ |
| $G_{13}$ | $G_{15}$ | $G_{22}$ |
| $G_{20}$ | $G_{20}$ | $G_{22}$ |
| $G_{20}$ | $G_{20}$ | $G_{24}$ |

| $G_1$ | $G_3$ | $G_5$ |
|---|---|---|
| $G_{13}$ | $G_{15}$ | $G_{17}$ |
| $G_{25}$ | $G_{27}$ | $G_{29}$ |

| $R_2$ | $R_4$ | $R_6$ |
|---|---|---|
| $R_{14}$ | $R_{16}$ | $R_{18}$ |
| $R_{26}$ | $R_{28}$ | $R_{30}$ |

| $B_7$ | $B_9$ | $B_{11}$ |
|---|---|---|
| $B_{19}$ | $B_{21}$ | $B_{23}$ |
| $B_{31}$ | $B_{33}$ | $B_{35}$ |

METHOD AND APPARATUS APPLYING DIGITAL IMAGE FILTERING TO COLOR FILTER ARRAY DATA

BACKGROUND OF THE INVENTION

1. Field of the Invention

The present invention relates generally to digital imaging. More particularly, the present invention relates to a method and device applying digital image filtering to CFA data.

2. Description of the Related Art

In a typical digital imaging system, a digital camera captures and stores an image into a video buffer, e.g., in RGB or other multi-plane format. The data is then fetched from the video buffer and sent to a digital display, such as an LCD panel.

Typically, small battery-powered digital imaging devices such as video or still cameras, and devices incorporating such cameras, such as cell phones, personal digital assistants (PDAs), etc., have not been considered to be powerful enough to provide digital image processing capability. Specifically, such devices lack the processor and memory requirements to add digital filter effects such as soften, blur, emboss, directional blur, sepia, or black & white (grey scale) effects.

In prior art imaging systems, the user would compose the picture and commit it to memory prior to selecting or applying a digital filter effect to the image. For example, in the ordinary sequence of events of taking a picture using a digital camera, a photographer would first compose a picture, for example, by aiming a camera at a subject. When the photographer is happy with the composition, he or she "takes the picture," by storing the image in memory. After the image is in local memory, the photographer may then select a filter effect to apply to the image and apply the effect. Typically, a filter effect will be applied after the image is downloaded to a personal computer having increased memory and processing power. After applying the filter effect, the modified image is displayed for the photographer to view. If the photographer likes the resulting filtered image, he or she may keep the image, e.g., by printing it or storing it in non-volatile memory. In the case of camera-enabled communication devices, such as cell phones, the user may transmit the image to a remote location. However, if the photographer decides the resulting image is not desired, he or she may undo the filter operation, and either decide to apply a different filter, or no filter at all.

The preceding description is very acceptable for high powered machines such as personal computers, to execute the software filter reasonably fast. However, for many imaging devices such as small digital cameras, cell phones, and other devices, the memory and processing requirements are excessive.

For example, a camera having a 3.8 Mega-pixel sensor has an image resolution of 2272×1704 pixels. This means that the total number of pixels representing the image is 3,871,488 pixels. Each pixel may consist of 8 bits providing the red component, 8 bits for the green component, and 8 bits for the blue component, for a total of 3 bytes or 24 bits per pixel.

Many filter effects are applied by the well-known convolution filter. Such filter effects include soften, blur, edge detection, emboss, etc. For a simple implementation, assume the digital filter circuitry fetches 9 pixels in a 3×3 matrix 80 as shown in FIG. 1, and performs a particular function depending upon the filter be applied. Each matrix includes 9 pixels labeled $P_1$ to $P_9$ as shown in FIG. 1 with pixel $P_5$ in the center. Pixel $P_5$ may be substituted with a new pixel $P_5'$ based on the neighboring pixel values, e.g., by the formula:

$$P_5' = (P_1C_1 + P_2C_2 + P_3C_3 + P_4C_4 + P_5C_5 + P_6C_6 + P_7C_7 + P_8C_8 + P_9C_9)/Div \quad (1)$$

wherein $C_1$ to $C_9$ are constants and Div is a divide value. Each pixel P is defined by red, green, and blue intensity values. For pixels defined by 24 bits per pixel, typically each red, green, and blue intensity value will be represented by a number ranging from 0 to 255. Thus, for each pixel, Equation 1 is calculated three times, i.e., once for each color value. In addition each color component for $P_5'$ is constrained to a minimum of zero and a maximum of 255. Various effects can be achieved depending on the constant values chosen. Common convolution filter effects include blur and soften effects. Other possible effects include sharpen, edge detection, emboss, and directional blur. Convolution filter effects are well known and understood in the image-processing field.

Under this method, the total bytes transferred to the camera interface from the camera is three times the number of pixels (at 3 bytes per pixel) or 11.06 M bytes (where 1 M byte=1024 K bytes, and 1 K byte=1024 bytes). Secondly, the number of accesses required to memory is 9 reads times the number of pixels, which is 3,866,944+1 write times the number of pixels. In the example, this works out to 38,669,440 memory accesses for the exemplary filter implementation. This is a large processing task for small battery-powered devices.

It has been known to provide a real-time digital image preview via a digital display that users can use when composing a shot. Many users prefer to see such a live, real-time, digital image preview rather than looking through a viewfinder to frame and compose the image. However, such real-time previews have not included image enhancement or other processing or filtering.

The problem of providing the enhanced functionality of image processing to an imaging device without large memory and processing requirements has not been adequately addressed prior to the present invention.

SUMMARY OF THE INVENTION

Broadly speaking, the present invention fills these needs by providing a digital imaging device and method providing digital filter effects.

It should be appreciated that the present invention can be implemented in numerous ways, including as a process, an apparatus, a system, a device, or a method. Several inventive embodiments of the present invention are described below.

In one embodiment, a method and graphics controller for processing an image is provided wherein color filter array (CFA) data representing the image is received from a digital image capture device into a buffer, a digital filter effect is applied to the CFA data to generate filtered CFA data representing a filtered image, and the filtered image is displayed in real time on a display.

In another embodiment, a method and graphics controller for processing an image is provided wherein color filter array (CFA) data representing an image from a digital image capture device is received into a buffer and a convolution filter is applied to the CFA data to generate filtered CFA data representing a filtered image. The convolution filter, for each particular pixel represented in the CFA data, calculates a new value for the particular pixel by passing values of the particular pixel and neighboring pixels having the same color as the particular pixel through an algorithm. The values of the particular pixel and each neighboring pixel of the same color is multiplied by a respective coefficient resulting in a plurality of products, the sum of the products being divided by a divide-by value.

In another embodiment, a method for processing an image comprises receiving color filter array (CFA) data representing an image from a digital image capture device into a buffer and applying a convolution filter to the CFA data to generate filtered RGB data representing a filtered image. The convolution filter comprises for each particular pixel represented in the CFA data, calculating a new red, green, and blue intensity values the particular pixel by solving a reduced convolution equation using nearest neighbors of neighboring pixels of the particular pixel in the CFA data. In unreduced form, the convolution equation adds each neighboring pixel having a matching color as the value being calculated or a nearest neighbor having a matching color multiplied by a respective coefficient resulting in a plurality of products, the sum of the products being divided by a divide-by value.

In yet another embodiment, a method for capturing an image with an image capture device is provided. A digital filter effect is selected to be applied to the image. The image capture device is aimed at a subject to compose the image and the image is previewed using a digital display that provides a real-time preview of the image with the filter effect applied. The image is captured by storing it in non-volatile memory or transmitting one frame of the real-time preview.

BRIEF DESCRIPTION OF THE DRAWINGS

The present invention will be readily understood by the following detailed description in conjunction with the accompanying drawings, and like reference numerals designate like structural elements.

FIG. 4 shows a 6×6 matrix of color filter array data.

FIG. 5 shows a 3×6 matrix of an array of green pixels generated from a portion of the matrix shown in FIG. 4.

FIGS. 6A, 6B, and 6C show 3×3 arrays for green, red, and blue, respectively, generated from portions of the matrix shown in FIG. 4.

FIG. 9 shows flow chart depicting an exemplary procedure for applying a digital filter effect to an image.

DETAILED DESCRIPTION

Figure 1:
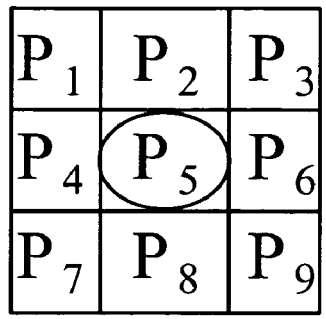
FIG. 1 shows a 3×3 matrix illustrating an algorithm for applying a convolution filter to an image.
Figure 2:
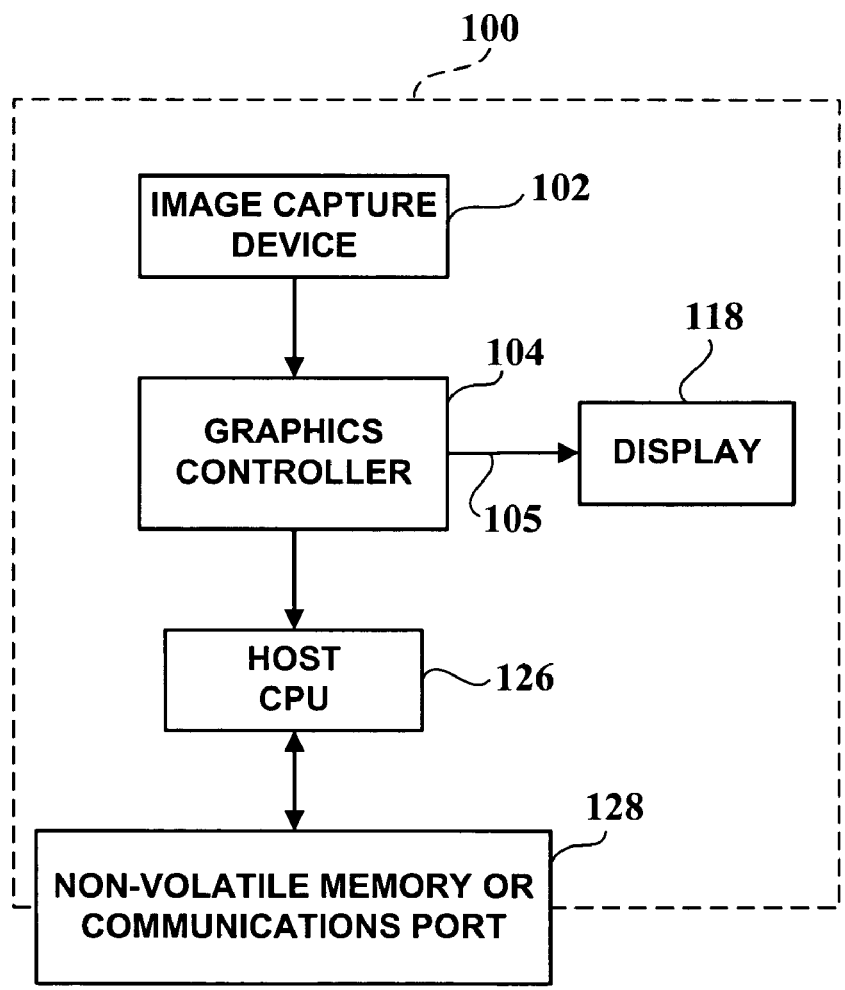
FIG. 2 shows a schematic overview of an exemplary image capture device.

FIG. 2 shows a schematic overview of an imaging device 100. Imaging device 100 may be a digital camera, digital video recorder, or some electronic device incorporating a digital camera or video recorder, such as, for example, a personal digital assistant (PDA), cell phone or other communications device, etc. Imaging device 100 includes a graphics controller 104, a host central processing unit (CPU) 126, a display 118, and an image capture device 102. Graphics controller 104 provides an interface between display 118, host CPU 126, and image capture device 102.

The timing control signals and data lines, such as line 105 communicating between graphics controller 104 and display 118, are shown as a single line but may in fact be several address, data, and control lines and/or a bus. All communication lines shown in the figures will be presented in this manner to reduce the complexity and better present the novel aspects of the invention.

Host CPU 126 performs digital processing operations and communicates with graphics controller 104. Host CPU is also in communication with non-volatile memory (NVM) or communication port 128. NVM or communications port 128 may be internal NVM such as flash memory or other EEPROM, or magnetic media. Alternatively, NVM or communications port 128 may take the form of a removable memory card such as that widely available and sold under such trademarks as "SD RAM," "Compact Flash", and "Memory Stick". NVM or communications port 128 may also be any other type of machine-readable removable or non-removable media, including, for example USB storage, flash-memory storage drives, and magnetic media. Finally, non-volatile memory or communications port 128 may be a communications port to some external storage device or destination. For example, if digital imaging device is a communications device such as a cell phone, non-volatile memory or communications port 128 may represent a communications link to a carrier, which may then store data on hard drives as service to customers, or transmit the data to another cell phone.

Display 118 can be any form of display capable of displaying an image. Generally, display 118 will comprise a liquid crystal display (LCD). However, other types of displays are available or may become available that are capable of displaying an image. Although image capture device 102 and display 118 are presented as being part of digital imaging device 100, it is possible that one or both of image capture device 102 and display 118 are external to or even remote from each other and/or graphics controller 104. For example, if digital imaging device is a security camera or baby monitor, for instance, it may be desirable to provide a display 118 remote from the image capture device 102 to provide monitoring capability at a remote location.

Image capture device 102 may include a charged coupled device or complementary metal oxide semiconductor type sensor having varying resolutions depending upon the application. In one embodiment, image capture device 102 includes a color sensor containing a two-dimensional array of pixel sensors in which each pixel sensor has a color filter in front of it in what is known as a color filter array (CFA). One common type of CFA is the Bayer filter in which every other pixel has a green filter over it in a checkerboard pattern, with remaining pixels in alternate rows having blue and red filters. An exemplary Bayer filter layout is shown in FIG. 4, which will be discussed in further detail below. When the color sensor reads out data from an image capture, the data is referred to as "CFA data" which describes a single two-dimensional array of pixels containing information for all three primary colors of red, green, and blue. This contrasts with RGB data which describes three two-dimensional arrays, or "planes" of pixels: one plane for red pixels, one plane for blue pixels, and one plane for green pixels.

CFA data is transmitted from image capture device 102 to graphics controller 104 which may then provide image data to display 118 or host CPU 126. As mentioned previously, display 118 is any type of display capable of displaying an image. Typically, this will be an LCD display for small handheld devices, although other types of displays such as plasma displays, electronic paper, and cathode ray tubes (CRTs), may be used as well.

In one embodiment, image capture device 102 captures data at several frames per second, e.g., 15 frames per second, which are displayed on display 118 to provide a preview prior to committing an image to NVM or communications port 128. When the user is happy with a particular composition, he or she causes the image to be sent to NVM or communications port 128, e.g., by pressing a button (not shown). It is also possible to store a plurality of frames in quick succession to create a video.

Figure 3:
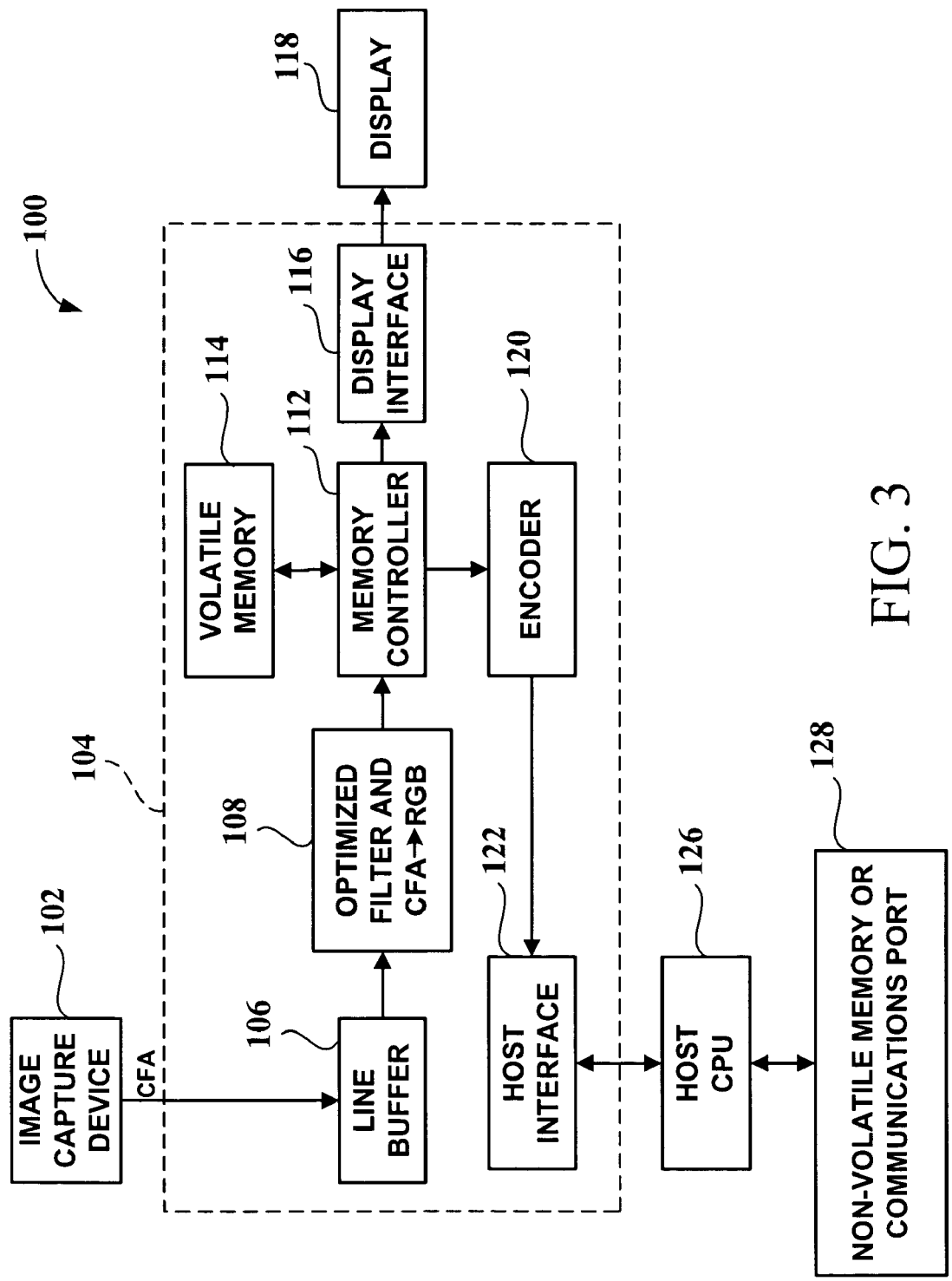
FIG. 3 shows one exemplary embodiment of a graphics controller for the image capture device of FIG. 2.

Referring now to FIG. 3, an exemplary graphics controller 104 comprises a number of processing elements schematically represented as a series of blocks describing their function. In this embodiment, CFA data from image capture device 102 is first received in a line buffer 106. As will be described in further detail below, optimized filter and converter 108 reads the CFA data and converts and applies a selected filter effect in one step, outputting filtered RGB data.

In one embodiment, optimized filter and converter 108 performs image processing using hardware image processing devices. For example, filter 108 may include a plurality of data pathways configured to either simply convert the data to RGB without modification when the filter is OFF, or pass through one or more filtering pathways which perform data manipulations on the CFA data to output a filtered RGB image, as will be further described below. Such data manipulations would comprise digital filter effects, such as may be provided by a convolution filter. Examples include soften, blur, sharpen, emboss, directional blur, etc. Other well-known effects such as grayscale, sepia, posterize, vignette, etc. as known and understood in the art, are also possible.

Memory controller 112 receives RGB data from optimized filter and converter 108 and temporarily stores the RGB data in volatile memory 114. Memory controller 112 also makes this RGB data available to display interface 116 and to host interface 122 via encoder 120.

Display interface 116 includes timing circuits and or other circuitry necessary for displaying the image represented by the RGB data on display 118. Display 118, upon receiving display data from display interface 116 displays the image for the user to view. It should be noted that this view is generally a live, real-time image captured a definite period of time from the moment image capture device 102 captured the image. Typically, this definite period of time will be a fraction of a second, and may be refreshed a number of times a second, e.g., 15 times a second, to provide a preview image to the user of exactly what the image will look like if committed to NVM or communications port 128.

At some point, the user may decide that a picture is properly composed and will want to store the image for later viewing or transmit it to a friend. Typically, the user may press a button (not shown) to generate an image that can be saved for later use or transmitted to a friend. Host CPU 126 will respond to this event by retrieving the image stored in volatile memory 114. Memory controller 112 will send the RGB data stored in volatile memory 114 to encoder 120. Encoder 120 may compress the image into a compressed image format, e.g., the well-known JPEG format, and pass the compressed image data to host interface 122 which provides it to Host CPU 126. Host CPU 126 may then store the image or transmit the image using NVM or communications port 128.

An exemplary implementation of the optimized filter and converter 108 will now be described. FIG. 4 shows an exemplary image portion 150 showing the layout of CFA data comprising six columns and six rows of pixels. Each pixel is identified by a letter indicating the color and a subscript identifying its position in the array. The first row contains alternating green (G) and red (R) pixels, the second row alternating blue (B) and green (G) pixels, with subsequent rows repeating this pattern. This layout is consistent with the well-known Bayer color filter array. Each pixel in image portion 150 is further identified with a sequentially-numbered subscript starting with 1 in the upper left corner ($G_1$) and ending at the bottom right pixel ($G_{36}$).

In one embodiment, line buffer 106 (FIG. 3) stores 3 rows 152 (FIG. 4) of CFA data. To implement a convolution to the CFA data, red, green, and blue intensity values are generated for each pixel from the "nearest neighbor" of each neighboring pixel. The nearest neighbor is a known technique for converting CFA data to RGB data without interpolation. For example, FIG. 5 shows an array representative of green pixels generated from the three rows 152 of the CFA data array shown in FIG. 4. Each initially green pixel from the original CFA data is represented in the green array, and the remaining pixels are given the value of the nearest-neighbor green pixel. Thus, for the first line, which is originally "$B_7$-$G_8$-$B_9$-$G_{10}$-$B_{11}$-$G_{12}$" the first line for green data will read "$G_8$-$G_8$-$G_8$-$G_{10}$-$G_{10}$-$G_{12}$." For pixel 162 (labeled $G_{15}$ in FIG. 4) FIG. 6A shows the nearest neighbor green pixels, FIG. 6B shows the nearest neighbor red pixels, and FIG. 6C shows the nearest neighbor blue pixels. FIGS. 6A, 6B, and 6C are shown for the purpose of explanation of the derivation of the convolution filter formula, which will be now be described.

From Equation 1 above, looking for the moment at table 164 shown in FIG. 6A the values of nearest neighbor pixels are applied as follows:

$$G'_{15} = (G_8 C_1 + G_8 C_2 + G_{10} C_3 + G_{13} C_4 + \\ G_{15} C_5 + G_{15} C_6 + G_{20} C_7 + G_{20} C_8 + G_{22} C_9)/Div \quad (2)$$

which reduces to $$G'_9 = (G_8 C_{1+2} + G_{10} C_3 + G_{13} C_4 + G_{15} C_{5+6} + G_{20} C_{7+8} + G_{22} C_9)/Div \quad (3)$$

Thus, the terms $G_8 C_1$ and $G_8 C_2$ are combined into the single term $G_8 C_{1+2}$ in the reduced convolution equation represented in Equation 3. Note that $C_{2+3}$ may be pre-defined at run-time, or it may be calculated on the fly by the filter and converter circuitry. In either case, convolution equation 3 includes combined terms containing a common nearest neighbor value.

Likewise, for the same pixel 162, but for red (see table 170 in FIG. 6B):

$$R'_9 = (R_2 C_1 + R_2 C_2 + R_4 C_3 + R_{14} C_4 + \\ R_{14} C_5 + R_{16} C_6 + R_{14} C_7 + R_{14} C_8 + R_{16} C_9)/Div \quad (4)$$

which reduces to $$R'_9 = (R_2 C_{1+2} + R_4 C_{3+6} + R_{14} C_{4+5+7+9} + R_{16} C_{6+9})/Div \quad (5)$$

A similar reduction will be provided for each blue pixel, such as pixel 162 seen in FIG. 4 and table 175 in FIG. 6C. As can be seen, red, green, and blue intensity values can be generated for each pixel represented in FIG. 4 and a filter applied in one step. Since the constant values are predetermined for the particular convolution filter effect, the combined pixels do not have to be separately calculated. Thus, by combining the CFA-to-RGB conversion with the filtering function, the number of calculations and data accesses necessary for applying the filter is significantly reduced over prior art methods of applying a filter effect to RGB data, with the same resulting image.

After red, green, and blue intensity values are calculated for each pixel in the third row of pixels of the array shown in FIG. 4, a fourth row 154 is inserted into the line buffer and the top row is pushed off, so that the third row starting with pixel $B_{19}$ starts the "new" second row of pixels in the three-line buffer. Thus, line buffer 106 (FIG. 3) will always contain three lines so that one line of red, green, and blue data can be generated. It should be noted that this technique, while presented for convolution filters using a 9-pixel area could be expanded to larger pixel sets for enhanced convolution filter effects. In this case, line buffer 106 may contain more than three lines of data.

Figure 7:
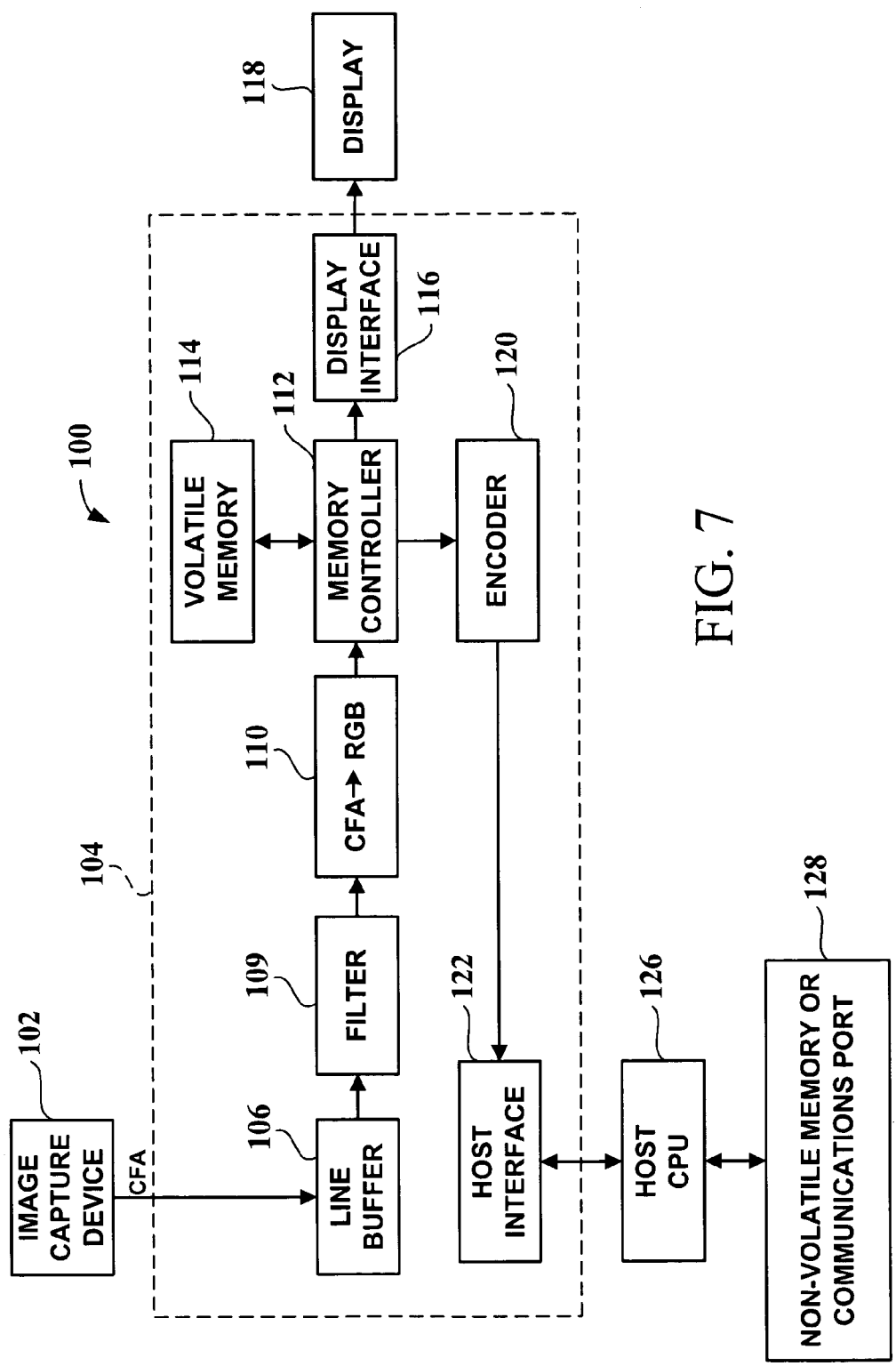
FIG. 7 shows another exemplary embodiment of a graphics controller for the image capture device of FIG. 2.

FIG. 7 shows another embodiment of a graphics controller 104 for imaging device 100. In this embodiment, image capture device 102 generates CFA image data which is provided to line buffer 106. Filter 109 applies a filter effect directly to the CFA image data and outputs filtered CFA image data to CFA-to-RGB converter 110. CFA-to-RGB converter 110 converts the filtered CFA image data to RGB data representing an image having the same number of pixels, but with red, green, and blue values for each pixel. This conversion may be accomplished by the implementation of well-understood interpolation algorithms to determine the missing color information for each pixel, or by using a nearest neighbor algorithm as described above. Memory controller 112, volatile memory 114, display interface 116, display 118, encoder 120, and host interface 122 all function as described above with reference to FIG. 3.

Figures 8A, 8B, 8C:
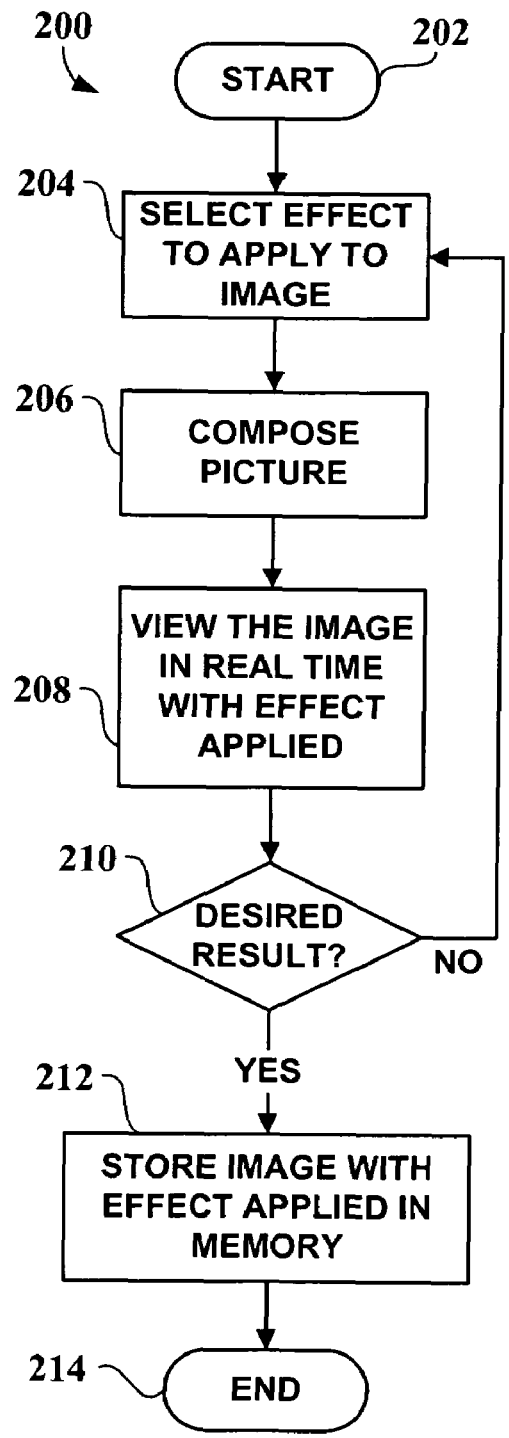
FIGS. 8A, 8B, and 8C show array subsets taken from the color filter array shown in FIG. 4.

For this embodiment, line buffer 106 stores five rows 156 (FIG. 4) of CFA data. To implement the convolution filter to CFA data, the intensity value of each pixel is replaced with a new value determined from all neighboring pixels of the same color. FIGS. 8A, 8B, and 8C show exemplary same-color neighbors for pixel $G_{15}$, $R_{16}$, and $B_{21}$ from FIG. 4 in tables 180, 184, and 188, respectively. Thus for example, application of the convolution filter would calculate a new value $G_{15}'$ by:

$$G'_{15} = (G_1 C_1 + G_3 C_2 + G_5 C_3 + G_{13} C_4 + \qquad (6)$$
$$G_{15} C_5 + G_{17} C_6 + G_{25} C_7 + G_{27} C_8 + G_{29} C_9)/Div$$

where each C value represents a predetermined coefficient and Div is a divide-by value. After the third row of pixels is filtered, the first row is discarded and the sixth row 158 (FIG. 4) is loaded into line buffer 106 to again provide the five rows necessary for implementing the convolution filter with CFA data. Unlike the previous embodiment, only one color intensity value is calculated for each pixel. Thus, filtered CFA data is generated rather than filtered RGB data.

Application of the convolution filter or other filter effects directly to the CFA data has significant advantages in terms of resource requirements. This is primarily due to the fact that CFA data is one third the size of RGB data. Therefore, for a 24 bit RGB image having three bytes per pixel, the corresponding CFA data has only one byte per pixel. This level of data processing is manageable in real-time by filter 109 (FIG. 7) using hardware image processing. Proper selection of coefficients and application of this algorithm to each of the pixels in the CFA image and subsequent conversion to RGB format will result in an image substantially indistinguishable from the prior art method of applying the filter after converting to RGB format.

It should also be recognized that, for the embodiments described above, each pixel color may be treated independently of the other pixel colors so that coefficients $C_1$-$C_9$ and divide-by value Div may vary depending on the color of the pixel being calculated. In addition, special measures may be taken to handle edge pixels. For example, the edge pixels may be ignored, or the edge rows and columns may be duplicated to artificially supply adjacent values missing from the image.

An advantage to real-time filtering of image data is shown by flowchart 200 shown in FIG. 9. Flowchart 200 presents an exemplary method for taking a picture using technology presented herein. The procedure begins as indicated by starting block 202 and flows to operation 204 wherein the user initially selects an effect to apply to the image. As mentioned previously, a choice of digital filter effects may be presented including soften, sharpen, edge detect, emboss, directional blur, sepia, black and white (grayscale), vignette, posterize, etc. In addition, the user may decide not to apply a digital filter effect, i.e., to select no effect. After the user makes his or her selection, the next operation 206 is performed wherein the user composes the picture, e.g., by aiming the image capture device at the intended subject of the picture. During the composition process, the user may view the image in real time with the selected filter effect applied on a digital display, as indicated in operation 208. At the following operation 210, the user may decide whether the selected effect provides a desired result. If not, the procedure flows back to operation 204 wherein another effect, or no effect, may be selected. If, at operation 210, the user decides that the effect does produce a desired result, the procedure flows to operation 212 wherein the user stores the image with the selected effect applied in non-volatile memory, e.g., by pushing a button. The procedure then ends as indicated by ending block 214.

As mentioned, this procedure provides the advantage that the user has the opportunity to view the resulting image with the effect applied using display 118 as a preview display. This opens up new creative opportunities for the photographer who now has the capability to compose a picture with instant feedback as to what the image will look like with a filter applied, so that the composition can now take into account the effect the digital filter will have on the resulting shot.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for processing an image, the method comprising:
   receiving color filter array (CFA) data representing an image from a digital image capture device into a buffer; wherein an imaging device performs the following operations:
   applying a digital filter effect to the CFA data to generate one of filtered CFA data or filtered RGB data representing a filtered image, the applying including,
   for each particular pixel represented in the CFA data, calculating a new red, a new green, and a new blue intensity value for the particular pixel, the calculating including,
   generating a nearest neighbor array for each particular pixel color where positions in the array are filled with a nearest neighbor pixel of a same color of the particular pixel color along a row of the CFA data; and solving a reduced convolution equation using the nearest neighbor array to obtain the new intensity value of the particular pixel color, wherein the reduced convolution equation combines terms in the nearest neighbor array; and displaying the filtered image in real time on a display in the digital image capture device.

2. The method of claim 1 wherein the CFA data is Bayer data.

3. The method of claim 1 wherein the applying a digital filter effect generates filtered CFA data, the solving a reduced convolution equation further comprising applying a convolution filter to the nearest neighbor array wherein each particular pixel color is calculated by multiplying pixels in the nearest neighbor array by a respective predetermined constant coefficient to generate a plurality of products and dividing a sum of the products by a divide-by value.

4. The method of claim 3 wherein the buffer is a line buffer and the receiving comprises storing five lines of the CFA data at a time in the line buffer, the applying a digital filter effect comprising calculating a line of the filtered CFA data at a time using the CFA data stored in the line buffer wherein after each line of the filtered CFA data is calculated, a new line is received into the line buffer and an oldest line is deleted thereby providing data for calculating a next line of the filtered CFA data.

5. The method of claim 1 wherein the applying is performed by a hardware digital filter.

6. The method of claim 3 wherein the convolution filter is one of a soften filter, blur filter, sharpen filter, emboss filter, directional blur filter, and edge detect filter.

7. The method of claim 1 wherein the displaying the filtered image in real time comprises generating a plurality of frames of video at regular intervals, each of the frames being filtered and displayed on the display with the digital filter effect applied within a predefined time from the receiving.

8. The method of claim 1 further comprising selectively storing the filtered image in non-volatile memory.

9. The method of claim 8 wherein the filtered CFA data is converted into a compressed image format prior to the storing.

10. The method of claim 1 further comprising selectively transmitting the filtered image to a remote destination.

11. The method of claim 1 wherein the digital filter effect is selected from a plurality of digital filter effects.

12. The method of claim 1, wherein the positions in the nearest neighbor value are combined with respective predetermined constant coefficients and wherein one of the positions in the nearest neighboring pixels corresponds to one of the positions substituted with the nearest neighbor.

13. A method for processing an image, the method comprising:

receiving color filter array (CFA) data representing an image from a digital image capture device into a buffer, wherein an imaging device perform the following operations:

wherein an imaging device performs the following operations:

applying a convolution filter to the CFA data to generate filtered CFA data representing a filtered image; and displaying the filtered image in real time on a display in the digital image capture device, wherein the applying the convolution filter comprises for each particular pixel represented in the CFA data, calculating a new value for the particular pixel by passing old values of the particular pixel and neighboring pixels having a same color as the particular pixel through an algorithm wherein the old values are each multiplied by a respective predetermined constant coefficient resulting in a plurality of products and the sum of the products are divided by a divide-by value, the calculating including generating a nearest neighbor array for each particular pixel color where positions in the array are filled with a nearest neighbor pixel of a same color of the particular pixel color along a row of the CFA data; and wherein the algorithm employs a reduced convolution equation that combines terms in the nearest neighbor array.

14. The method of claim 13 wherein the convolution filter provides one of a soften effect, blur effect, emboss effect, directional blur effect, or edge detect effect to the image.

15. The method of claim 13 wherein the algorithm is selected from a plurality of algorithms depending upon on the color of the particular pixel.

16. The method of claim 13 wherein the applying a convolution filter comprises passing the CFA data through a hardware filter.

17. The method of claim 13 further comprising:

generating a video data stream comprising generating a plurality of frames of the filtered CFA data at regular intervals; and displaying the video data stream as a video on the display, each of the frames of the video data stream being filtered and displayed on the display within a predefined time on the display with the digital filter effect applied.

18. The method of claim 17 further comprising selectively storing at least one of the frames in non-volatile memory.

19. A method for processing an image, the method comprising:

receiving color filter array (CFA) data representing an image from a digital image capture device into a buffer, wherein an imaging device perform the following operations:

wherein an imaging device performs the following operations:

applying a convolution filter to the CFA data to generate filtered RGB data representing a filtered image; and displaying the filtered image in real time on a display in the digital image capture device, wherein the applying the convolution filter comprises for each particular pixel represented in the CFA data, calculating a red, a green, and a blue RGB intensity value for the particular pixel, the calculating including, generating a nearest neighbor array for each particular pixel color where positions in the array are filled with a nearest neighbor pixel of a same color of the particular pixel color along a row of the CFA data; and solving a reduced convolution equation using the nearest neighbor array to obtain the RGB intensity value of the particular pixel color, wherein the reduced convolution equation combines terms in the nearest neighbor array.

20. The method of claim 19 wherein the convolution filter provides one of a soften effect, blur effect, emboss effect, directional blur effect, or edge detect effect to the image.

21. The method of claim 19 wherein the algorithm is selected from a plurality of algorithms depending upon on the color of the particular pixel.

22. The method of claim 19 wherein the applying a convolution filter comprises passing the CFA data through a combined hardware filter and CFA-to-RGB converter.

23. The method of claim 19 further comprising:
generating a video data stream comprising generating a plurality of frames of the filtered RGB data at regular intervals; and
displaying the video data stream as a video on the display, each of the frames of the video data stream being filtered and displayed on the display within a predefined time on the display with the digital filter effect applied.

24. The method of claim 23 further comprising selectively storing at least one of the frames in non-volatile memory.

25. A graphics controller for processing an image, the graphics controller comprising:
a buffer receiving color filter array (CFA) data representing an image from a digital image capture device; and
a convolution filter that applies a convolution filter effect to the CFA data thereby generating filtered CFA data representing a filtered image, wherein the convolution filter, for each particular pixel represented in the CFA data, calculates a new red, a new green, and a new blue intensity value for the particular pixel, the calculating including,
generating a nearest neighbor array for each particular pixel color where positions in the array are filled with a nearest neighbor pixel of a same color of the particular pixel color along a row of the CFA data; and
solving a reduced convolution equation using the nearest neighbor array to obtain the new intensity value of the particular pixel color, wherein the reduced convolution equation combines terms in the nearest neighbor array.

26. The graphics controller of claim 25 wherein the convolution filter provides one of a soften effect, blur effect, emboss effect, directional blur effect, or edge detect effect to the image.

27. The graphics controller of claim 25 wherein the algorithm is selected from a plurality of algorithms depending upon on a color of the particular pixel.

28. The graphics controller of claim 25, wherein a video data stream comprising a plurality of frames of the filtered CFA data is generated at regular intervals.

29. The method of claim 19, wherein the terms in the common nearest neighbor array are multiplied by respective predetermined constant coefficients and wherein one of the adjacent neighboring pixels corresponds to one of the positions substituted with the nearest neighbor.

* * * * *

UNITED STATES PATENT AND TRADEMARK OFFICE
CERTIFICATE OF CORRECTION

PATENT NO. : 7,570,810 B2  Page 1 of 1
APPLICATION NO. : 11/066000
DATED : August 4, 2009
INVENTOR(S) : Barinder Singh Rai et al.

It is certified that error appears in the above-identified patent and that said Letters Patent is hereby corrected as shown below:

<u>Column 9,</u>

Lines 57 and 58, please delete "wherein an imaging device perform the following operations:" and <u>Column 10,</u>

Lines 38 and 39, please delete "wherein an imaging device perform the following operations:".

Signed and Sealed this

Third Day of November, 2009

David J. Kappos
*Director of the United States Patent and Trademark Office*